US006804295B1

(12) United States Patent
Belknap

(10) Patent No.: US 6,804,295 B1
(45) Date of Patent: Oct. 12, 2004

(54) CONVERSION OF VIDEO AND AUDIO TO A STREAMING SLIDE SHOW

(75) Inventor: William Russell Belknap, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,090

(22) Filed: Jan. 7, 2000

(51) Int. Cl.[7] .............................................. H04N 7/12
(52) U.S. Cl. ................................................ 375/240.01
(58) Field of Search ....................... 375/240.01, 240.02, 375/240.12, 240.28; 348/390, 399, 407, 419; 345/340, 348, 732; 700/1, 100; H04N 7/12

(56) References Cited

U.S. PATENT DOCUMENTS

| 5,123,088 | A | * | 6/1992 | Kasahara et al. ........... 345/845 |
| 5,590,262 | A | | 12/1996 | Isadore-Barreca |
| 5,661,665 | A | | 8/1997 | Glass et al. |
| 5,686,971 | A | | 11/1997 | Inamori |
| 5,784,149 | A | * | 7/1998 | Kawaoka ....................... 355/35 |
| 5,812,736 | A | | 9/1998 | Anderson |
| 5,831,616 | A | * | 11/1998 | Lee .............................. 345/348 |
| 5,872,874 | A | * | 2/1999 | Natarajan ................... 382/298 |
| 5,896,128 | A | | 4/1999 | Boyer |
| 5,995,153 | A | * | 11/1999 | Moeller et al. ............. 348/439 |
| 6,317,141 | B1 | * | 11/2001 | Pavley et al. ............... 345/732 |

FOREIGN PATENT DOCUMENTS

| EP | 0 737 930 A1 | 10/1996 |
| JP | 63-191488 | 8/1988 |
| JP | 08-292965 | 11/1996 |
| JP | 09-139913 | 5/1997 |
| JP | 10-108125 | 4/1998 |
| WO | WO 98/37699 | 8/1998 |

* cited by examiner

*Primary Examiner*—Nhon Diep
(74) *Attorney, Agent, or Firm*—Gates & Cooper LLP

(57) ABSTRACT

A technique for conversion of video and audio to a streaming slide show. A video stored on a data store connected to a computer is processed. Initially, a motion-based video comprised of a series of images is received. One or more images are selected from the motion-based video based on a desired bandwidth for transmission. Then, a streaming slide show is generated using the selected images.

33 Claims, 2 Drawing Sheets

CONVERSION OF VIDEO AND AUDIO TO A STREAMING SLIDE SHOW

BACKGROUND OF THE INVENTION

1. Field of the Invention

This invention relates in general to video and audio transmission systems performed by computers, and in particular, to conversion of video and audio to a streaming slide show.

2. Description of Related Art

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other types of data, store large volumes of it, and be able to distribute it on demand to users at their place of business or home via a network.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities.

Multimedia data is typically not fully pre-structured (i.e., its use is not fully predictable) because it is the result of the creation of a human being or the digitization of an object of the real world (e.g., movies). The digitization of multimedia information (image, audio, video) produces a large set of bits called an "object" or "large object" (LOB) or "binary large object" (BLOB). For example, a digitization of a movie, even after compression, may take as much as the equivalent of several billions of characters (3–4 GB) to be stored.

As more users are networked together, there is an increase in the storage of multimedia data, such as video and audio data, with transmission of the multimedia data to users via the network. However, full motion-based and/or full resolution videos are by nature large and, therefore, demand high bit rates for transmission over networks or modems. A motion-based video is a series of frames (i.e., a sequence of single still images) that are displayed in a manner that results in an optical illusion of motion, as perceived by a viewer. The bit rate or bandwidth refers to an amount of data that can be transmitted in a given period over a transmission channel (e.g., a network) and is typically represented as bits per second (bps).

The size of a video may result in very long download delays, greatly reduced resolution and quality, and, typically, very small image sizes, which render the original content difficult to view.

Thus, there is a need in the art for an improved technique for transmitting video data.

SUMMARY OF THE INVENTION

To overcome the limitations in the prior art described above, and to overcome other limitations that will become apparent upon reading and understanding the present specification, the present invention discloses a method, apparatus, and article of manufacture for conversion of video and audio to a streaming slide show.

According to an embodiment of the invention, a video stored on a data store connected to a computer is processed. Initially, a motion-based video comprised of a series of images is received. One or more images are selected from the motion-based video based on a desired bandwidth for transmission. Then, a streaming slide show is generated using the selected images.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
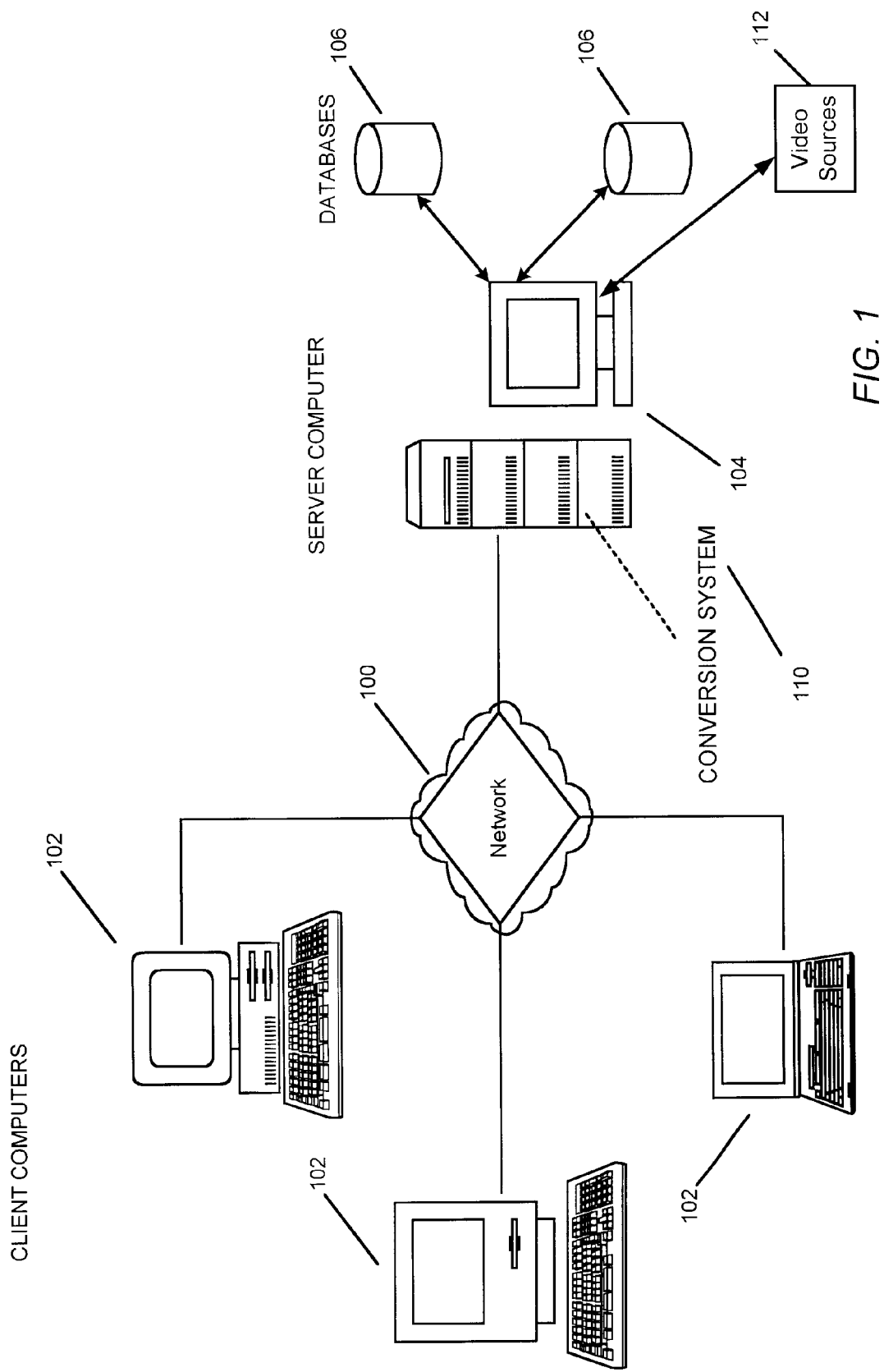
FIG. 1 is a hardware environment used to implement an embodiment of the invention.

FIG. 1 schematically illustrates the hardware environment of an embodiment of the present invention, and more particularly, illustrates a typical distributed computer system using a network 100 to connect client computers 102 executing client applications to a server computer 104 executing software and other computer programs, and to connect the server system 104 to data sources 106 and video sources 112. A data source 106 may comprise, for example, a multi-media database containing video. A video source 112 may comprise, for example, a live video stream or images from a camera.

A typical combination of resources may include client computers 102 that are personal computers or workstations, and a server computer 104 that is a personal computer, workstation, minicomputer, or mainframe. These systems are coupled to one another by various networks, including LANs, WANs, SNA networks, and the Internet. Each client computer 102 and the server computer 104 additionally comprise an operating system and one or more computer programs.

A client computer 102 typically executes a client application and is coupled to a server computer 104 executing one or more server software. The client application may be a computer program such as a video player. The server software may include a conversion system 110, which is a computer program for converting video to a streaming slide show. The server computer 104 also uses a data source interface and, possibly, other computer programs, for connecting to the data sources 106. The client computer 102 is bi-directionally coupled with the server computer 104 over a line or via a wireless system. In turn, the server computer 104 is bi-directionally coupled with data sources 106.

The operating system and computer programs are comprised of instructions which, when read and executed by the client and server computers 102 and 140, cause the client and server computers 102 and 140 to perform the steps necessary to implement and/or use the present invention. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Conversion of Video and Audio to a Streaming Slide Show

An embodiment of the invention provides a conversion system 110. The conversion system 110 receives a motion-based video (e.g., a movie). The motion-based video may have an audio component (referred to as an audio stream), as well as a video component (referred to as a video stream). The conversion system 110 converts the motion-based video into a series of slides (i.e., a streaming slide show). If the motion-based video has an audio component, the conversion system 110 incorporates the audio into the streaming slide show. The streaming slide show includes all of the audio component and selected portions of the video component. By creating a streaming slide show, the conversion system 110 reduces the size of the data to be transmitted. Then, the conversion system 110 transmits the streaming slide show, instead of the video. This avoids the problems associated with transmitting video, such as download delays or poor resolution of the video.

The conversion system 110 allows full resolution images to be displayed with synchronized audio, but as a "slide show" of individual images rather than as a motion-based video. A motion-based video is a series of frames (i.e., a sequence of single still images) that are displayed in a manner that results in an optical illusion of motion, as perceived by a viewer.

On the other hand, some conventional systems allow for selection of images, and these are displayed as "thumbnails", which are tiny, compressed images. For example, some conventional systems select frames from a video, using techniques, such as detecting scene changes. Then, these conventional systems create a "storyboard" or display with small sized images of the selected frames. The result is typically a set of low resolution, poor quality images that are difficult for a viewer to look at. Additionally, these thumbnails are built around scene changes, without regard to maintaining a desired bit rate.

To avoid the problems of conventional systems, the conversion system 110 creates a streaming slide show by extracting key content video frames from the motion-based video. In particular, the conversion system 110 receives a motion-based video. Then, the conversion system 110 analyzes the motion-based video to locate and mark key frames. Initially, the conversion system selects a set of candidate key frames. The selection of a set of candidate key frames is based on technologies well known in the art, such as scene change detection, camera pan, elapsed time, etc. The selected candidate key frames are converted into standard compressed image files (e.g., Joint Photographic Experts Group (JPEG)), resulting in candidate still images.

From the candidate still images, the conversion system 110 further selects slide show images that are to be combined with the audio. The conversion system 110 selects slide show images based on either a constant or variable bit rate based, for example, on user input. These slide show images are linked together and combined with audio to meet a specified bit rate and quality target (e.g., desired resolution or specific streaming rate for a target modem). The conversion system 110 is advantageous in that it selects images in a manner that provides a proper sequence of images that represent the important content, yet still maintains a smooth image flow, without exceeding the delivery bandwidth capacity.

Then, the conversion system 110 combines the selected slide show images with the audio component into a data stream. As an additional enhancement, the conversion system 110 can compress the audio component using well known technologies (e.g., subsampling, white space compression, etc.) to further reduce the data rate requirements while still maintaining the critical audio content.

The conversion system 110 outputs full resolution "slides" synchronized with the audio. This streaming slide show is most advantageous for low bit rate delivery mechanisms (e.g., modems) as well as networks. Having high quality audio with full resolution and high quality images, even on very low bit rate networks or connections, allows a user to hear all of the important audio information, while viewing the full resolution images. In most cases, the critical information is in the audio or captured in the key images, and not contained in the motion. Therefore, maintaining high quality of the key images, along with full audio, for the available bandwidth, allows a much better viewing experience.

Figure 2:
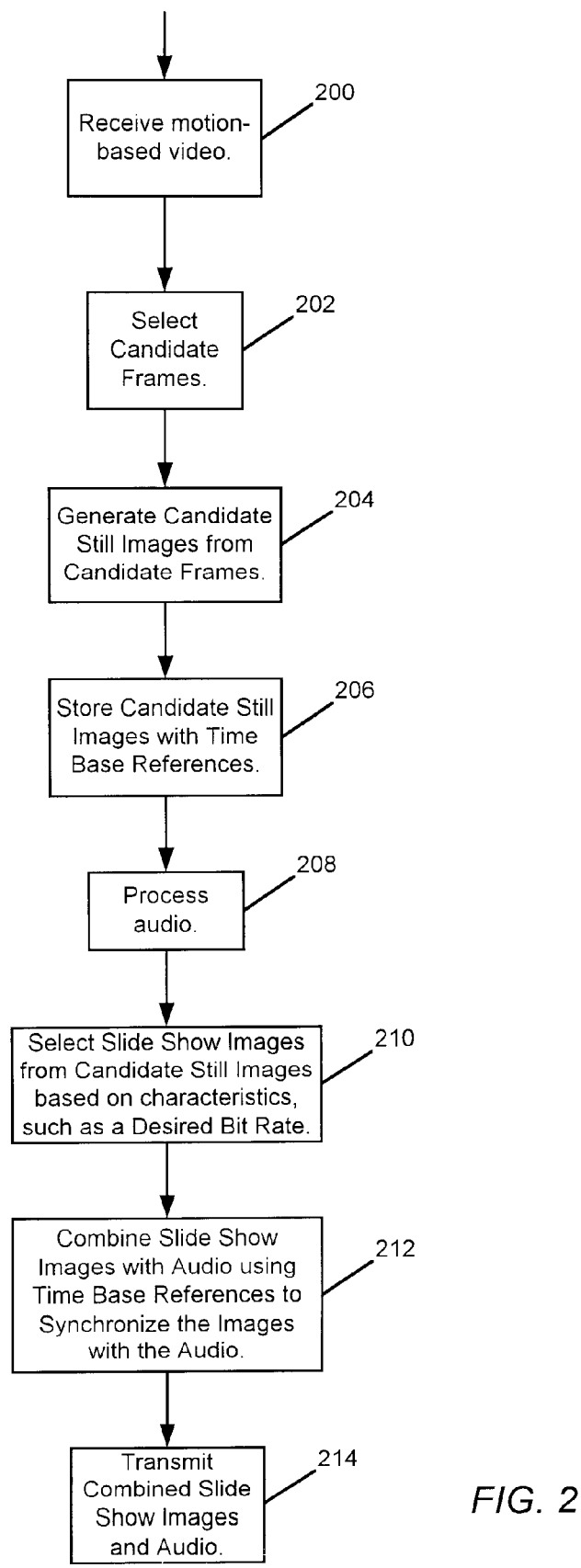
FIG. 2 is a flow diagram illustrating the steps performed by the conversion system.

FIG. 2 is a flow diagram illustrating the steps performed by the conversion system 110. Initially, in block 200, the conversion system 110 receives a full motion-based video comprised of synchronized audio and video components. For example, this motion-based video may be in a Moving Pictures Expert Group (MPEG) format. In block 202, the conversion system 110 processes the motion-based video to select candidate key frames (full resolution or stand-alone, independent video frames). In particular, the conversion system 110 analyzes the motion-based video to determine which frames represent important events (e.g., scene changes, camera pans or zooms, context changes, and other video events). This process is completed using technology well known to those familiar with the art.

Next, in block 204, the conversion system 110 generates candidate still images from the candidate key frames in standard formats (e.g., Joint Photographic Experts Group (JPEG), Graphics Interchange Format (GIF), or bit mapped graphics (BMP)). In block 206, the conversion system 110 stores these candidate still images with time base references. The time base references will be used by the conversion system 110 for synchronization with audio.

Then, the conversion system 110 processes the audio component in block 208. Optionally, the conversion system 110 compresses the audio component to reduce data rate, while still maintaining the time based synchronization information. Additionally, the conversion system 110 may remove white space from the audio.

In block 210, the conversion system 110 selects slide show images from the candidate still images based on bit rate, similarity of content with the previous image, the relative importance of the image compared to other candidate images based on similarities or differences, and the overall timing of frames necessary to achieve a smooth flow. Although the characteristics for selecting slide show images from candidate still images may be discussed separately, it is to be understood that the selection may be based on any one characteristic or some combination of characteristics.

To select slide show images based on a desired bit rate, the conversion system 110 performs a bit rate assessment. For the assessment, the conversion system 110 deducts the bandwidth required for the audio component from the total bandwidth available to determine the bandwidth required for the streaming slide show component (i.e., an image bit rate budget). Then, using the bandwidth required for the streaming slide show component and knowing the compression of each still image, the conversion system 110 determines the total number of slide show images that can be transmitted to maintain a desired bit rate. The total number of slide show images to be transmitted is calculated by multiplying the time required for transmitting the audio component with the image bit rate budget and dividing by an image size (i.e., the size of one of the slide show images).

Continuing with the discussion of how the conversion system 110 selects slide show images based on obtaining a desired bit rate, the desired bit rate may be obtained in several ways. For example, the desired bit rate may be user-specified or may be based on a quality target (e.g., a specified amount of time to download). For example, if the conversion system 110 can transmit one slide show image every 10 seconds (i.e., to obtain a bit rate equal to the number of bits of an image divided by 10 seconds), the conversion system 110 may select one candidate still image at every 10 second mark using the time base references associated with the images. In particular, there may be several candidate still images at or near a 10 second mark, and the conversion system 110 selects one of these. Selection may be based on various factors, for example, the middle candidate still image may be selected from a range around the 10 second mark. If no candidate still image is available at a 10 second mark, then the conversion system 110 selects, for example, a candidate still image whose time base reference is closest to and less than the 10 second mark or it may repeat the previous image.

To select slide show images based on similarity of content with the previous image, the conversion system 110 may use a tool to select candidate key frames that provides ranking of the frames. In particular, a rank ordering is provided along with the candidate key frames over, for example, a period of time. That is, over a one second interval, the candidate key frames selected in that interval are ranked.

To select slide show images based on other characteristics, the conversion system 110 may, for example, select candidate key frames so that if a single or very similar image is repeated over a relatively long time period, that image would be repeated only often enough to meet the minimum bandwidth constraints. If a series of rapidly changing images occur over a brief time period, only the most predominant images would be selected and included to stay below the maximum bandwidth constraints.

In block 212, once the conversion system 110 has a collection of slide show images and an audio component, both with sufficient timing information relative to each other to allow them to be combined in a synchronized manner, the conversion system 110 combines the selected slide show images with the audio component.

This combination process is one of the advantages of this invention in that the conversion system 110 combines the audio component with the selected slide show images for a particular bit rate. The invention is further advantageous in that the audio component is linked with slide show images in such a manner (multiplexed or otherwise combined in a format that allows synchronized playback using standard players from a standard bit stream) that playback of the images flows smoothly and presents most or all of the critical information that was contained in the video.

In block 214, the conversion system 110 transmits the streaming slide show. In particular, for transmission, the conversion system 110 may break up each slide show image into portions, interleave each slide show image portion with audio, and transmit this combination to a user at a client computer. At the client computer, the conversion system 110 reforms a slide show image from the portions for that slide show image. Then, the slide show image is displayed and its associated audio is played. In an alternate embodiment, the conversion system 110 may transmit the audio for a slide show image and all of the portions for that slide show image separately and then combine the audio and slide show image portions as the audio and slide show image portions are received (i.e., "on the fly").

Thus, the conversion system 110 automates the steps used for conversion, based on user definable parameters that determine the target data rate, the level of compression, image size, the priority of specific key frame types, etc. The benefits of a fully automated system include the automatic generation of high quality still image slides from a high bit rate video for low bit rate access techniques (e.g., transmission of data over a network), while still maintaining the full or maximum screen quality and resolution.

Conclusion

This concludes the description of an embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing a video stored on a data store connected to a computer, the method comprising the steps of:
   receiving a motion-based video comprised of a series of images and audio;
   determining and selecting a particular number of one or more images from the motion-based video based on a desired bandwidth for transmission, wherein the number of images selected is based on multiplying a time required for transmitting the audio with an image bit rate budget and dividing by an image size; and generating a streaming slide show using the selected images, wherein an order of the selected images in the slide show is in a defined sequence.

2. The method of claim 1, further comprising, prior to selecting one or more images, selecting one or more candidate frames.

3. The method of claim 2, further comprising ranking the selected candidate frames.

4. The method of claim 2, further comprising generating candidate images from the candidate frames.

5. The method of claim 4, wherein selecting the one or more images from the motion-based video comprises selecting from among the candidate images.

6. The method of claim 1, wherein the received motion-based video further comprises audio.

7. The method of claim 6, wherein the audio is synchronized with the selected images.

8. The method of claim 7, wherein the synchronization is performed using time base references associated with the selected images and with the audio.

9. The method of claim 1, wherein the desired bandwidth is obtained from user input.

10. The method of claim 1, wherein the desired bandwidth comprises a constant bit rate.

11. The method of claim 1, wherein the desired bandwidth comprises a variable bit rate.

12. An apparatus for processing a video, comprising:

a computer having a data store coupled thereto, wherein the data store stores the video; and one or more computer programs, performed by the computer, for receiving a motion-based video comprised of a series of images and audio, determining and selecting a particular number of one or more images from the motion-based video based on a desired bandwidth for transmission, wherein the number of images selected is based on multiplying a time required for transmitting the audio with an image bit rate budget and dividing by an image size, and generating a streaming slide show using the selected images, wherein an order of the selected images in the slide show is in a defined sequence.

13. The apparatus of claim 12, further comprising, prior to selecting one or more images, selecting one or more candidate frames.

14. The apparatus of claim 13, further comprising ranking the selected candidate frames.

15. The apparatus of claim 13, further comprising generating candidate images from the candidate frames.

16. The apparatus of claim 15, wherein selecting the one or more images from the motion-based video comprises selecting from among the candidate images.

17. The apparatus of claim 12, wherein the received motion-based video further comprises audio.

18. The apparatus of claim 17, wherein the audio is synchronized with the selected images.

19. The apparatus of claim 18, wherein the synchronization is performed using time base references associated with the selected images and with the audio.

20. The apparatus of claim 12, wherein the desired bandwidth is obtained from user input.

21. The apparatus of claim 12, wherein the desired bandwidth comprises a constant bit rate.

22. The apparatus of claim 12, wherein the desired bandwidth comprises a variable bit rate.

23. An article of manufacture comprising a program storage medium readable by a computer and embodying more instructions executable by the computer to perform method steps for processing a video stored on a data store connected to the computer, the method comprising the steps of:

receiving a motion-based video comprised of a series of images and audio;

determining and selecting a particular number of one or more still images from the motion-based video based on a desired bandwidth for transmission, wherein the number of images is based on multiplying a time required for transmitting the audio with an image bit rate budget and dividing by an image size; and generating a streaming slide show using the selected images, wherein an order of the selected images in the slide show is in a defined sequence.

24. The article of manufacture of claim 23, further comprising, prior to selecting one or more images, selecting one or more candidate frames.

25. The article of manufacture of claim 24, further comprising ranking the selected candidate frames.

26. The article of manufacture of claim 24, further comprising generating candidate images from the candidate frames.

27. The article of manufacture of claim 26, wherein selecting the one or more images from the motion-based video comprises selecting from among the candidate images.

28. The article of manufacture of claim 23, wherein the received motion-based video further comprises audio.

29. The article of manufacture of claim 28, wherein the audio is synchronized with the selected images.

30. The article of manufacture of claim 29, wherein the synchronization is performed using time base references associated with the selected images with the audio.

31. The article of manufacture of claim 23, wherein the desired bandwidth is obtained from user input.

32. The article of manufacture of claim 23, wherein the desired bandwidth comprises a constant bit rate.

33. The article of manufacture of claim 23, wherein the desired bandwidth comprises a variable bit rate.

* * * * *